Feb. 13, 1940.  G. HAGLUND  2,189,982
FLOWERPOT
Filed April 23, 1938  2 Sheets-Sheet 1

INVENTOR:
GUSTAF HAGLUND
BY Haseltine, Lake & Co.
ATTORNEYS

Feb. 13, 1940.    G. HAGLUND    2,189,982
FLOWERPOT
Filed April 23, 1938    2 Sheets-Sheet 2

INVENTOR:
GUSTAF HAGLUND
BY Haseltine, Lake & Co.
ATTORNEYS

Patented Feb. 13, 1940

2,189,982

UNITED STATES PATENT OFFICE 2,189,982

FLOWERPOT

Gustaf Haglund, Storangen at Stockholm, Sweden

Application April 23, 1938, Serial No. 203,730
In Germany May 27, 1937

4 Claims. (Cl. 47—38)

The degree of moisture in the earth of a flowerpot plays a considerable part for the thriving of the plant. The indoor plants are of many different kinds, and their need of moisture in the earth varies greatly. Also, the degree of moisture in the various parts of the pot is of great importance. A flowerpot should therefore be constructed so that the degree of moisture in the earth may also be found out in places other than the surface layer of the earth. It should be possible to supply water both from above and from beneath, as required, or from both directions at the same time, so that the proper moisture is imparted to the earth layer in the different parts of the pot. When the pot is watered from beneath, the watering should sometimes take place continuously and sometimes discontinuously. In flower pots of glazed earthenware or other non-porous ware, it should be attended to that there is a sufficiently large and porous bottom portion in the pot, which facilitates proper draining and aeration. In rooms heated by a radiator or radiators and in other dry localities it should be possible to replenish the pan of the flowerpot with water, without such water having necessarily to get into touch with the earth in the pot or to be sucked up by this earth. Hereby the moisture of the air is increased in the immediate proximity of the pot, the pot-plant being at the same time protected against overheating from beneath, in case the substructure is heated from a radiator of a domestic heating system or the like.

The present invention refers to a novel arrangement in flowerpots and to a specially constructed pan, on which the pots may be placed, whereby the above stated conditions for the thriving of the plant and the attendance of the same are attained in a simpler and more efficient manner than by the flowerpot constructions suggested heretofore.

Figure 1:
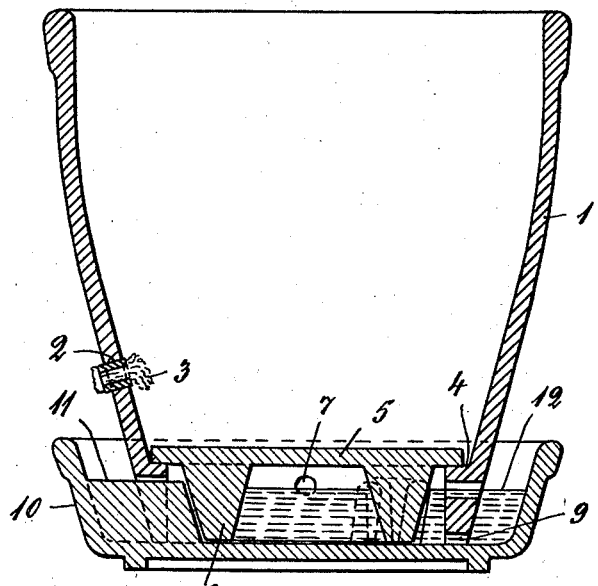
Figure 2:
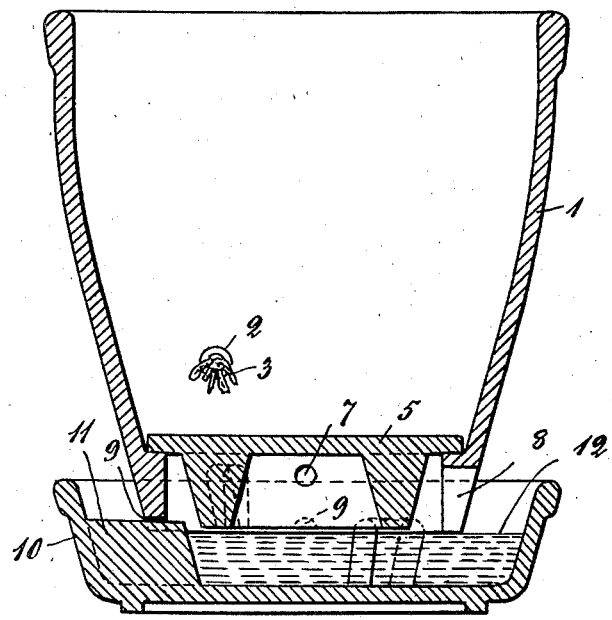
Figure 3:
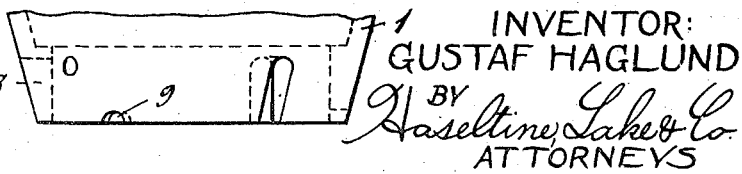
Figure 4:
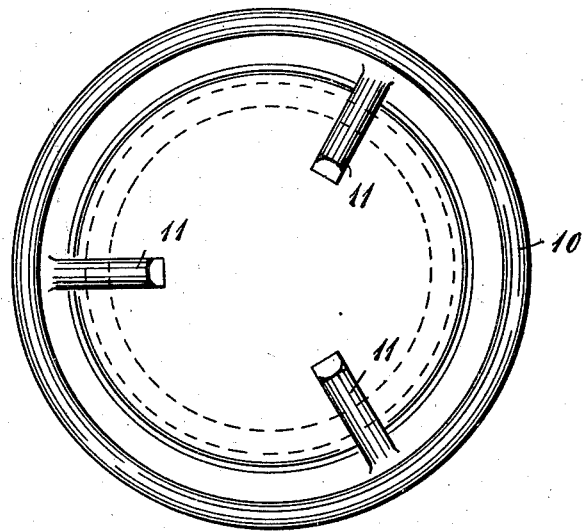
Figure 5:
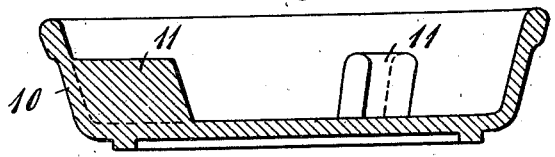
Figure 6:
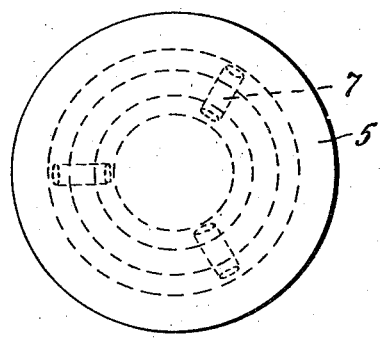
Figure 7:
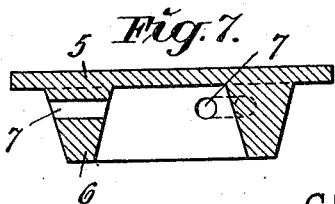

In the accompanying drawings, Fig. 1 shows a suitable construction of the flowerpot with the appertaining pan in vertical section, the pot being placed on the bottom of the pan. Fig. 2 shows the same construction, but with the pot turned by ⅙ revolution in the horizontal plane relatively to the pan, the pot having been raised so as not to rest on the bottom of the pan, but on three supporting ribs projecting from the sides in the pan. Fig. 3 shows the lower edge of the pot with recesses provided for the supporting ribs of the pan, said recesses facilitating placing of the pot in the position shown in Figs. 1 and 2. Figs. 4 and 5 show a suitable embodiment of the pan of the pot viewed from above and in vertical cross section respectively. Figs. 6 and 7 illustrate a loose pot bottom made from very porous ware, in a plan view and a vertical section respectively.

1 designates the flowerpot which is made from any suitable material and to the desired shape. 2 denotes one or more apertures in the side of the pot, said apertures having a porous stopper secured therein, such as a yarn wick or the like 3, which mediates the conduction of the moisture of the earth to the outside of the stopper, so that the degree of moisture in the interior of the pot may be controlled. 4 is an annular offset on the inner side of the pot, the porous plate 5 forming the bottom of the pot being adapted to rest on said offset. The plate 5 is provided with an annular downwardly directed extension 6, which is preferably provided with apertures 7 for aeration. The lower border of the pot 1 is provided with three recesses 8, which are deep and wide enough to permit the pot to rest with its lower border on the bottom of the pan in a certain position, notwithstanding the supporting ribs 11 of the pan 10. Moreover, the lower border of the pot 1 is provided with three shallow recesses 9 which are evenly distributed between the deep recesses 8, so that the pot may rest on the supporting ribs of the pan with the aid of these shallow recesses, as shown in Fig. 2. The pan 10 is comparatively deep, and the supporting ribs 11 are radially arranged, but do not extend further inwardly toward the centre but to provide sufficient space for the downwardly projecting portion 6 of the bottom plate 5, the ribs having a height such as to raise the pot above the bottom of the pan to a suitable level, when the pot is resting on these supporting ribs.

If a plant is considered which requires much water about its roots and less water at the surface, water is poured into the pan to a level corresponding to the line 12, and the pot is placed in the position shown in Fig. 1. The water in the pan is sucked up by the porous plate 5, 6, and the earth is kept moist in the lower portion of the pot, without the air being excluded from the lower side of the plate. By examining the stopper 3 it can be established whether the earth is sufficiently moist in the lower portion of the pot. If the earth sucks up too much water, the pot will be raised onto the supporting ribs 11 of the basin, as shown in Fig. 2. In the case of a plant requiring much water at the surface of the earth and less water at the bottom, the pot is placed into the position according to Fig. 2, and is then watered from above. By feeling the stopper 3 one may control that the earth will not be moister at the bottom than required. To keep the stopper dry, it will be necessary to water frequently and only a little at a time from above, if the surface of the earth is to be kept wet at the same time. If watering has been effected too abundantly from above, the water will flow through the plate 5 down into the pan 10, whence it cannot be sucked up again, however, by reason of the fact that the pot is positioned above the water line. If the lower portion of the pot becomes too dry relatively to the upper portion thereof, the pot will be lowered into the position according to Fig. 1. In this manner, the position of the pot may be altered so that the various parts thereof will always be given the desired moisture.

Independently of the degree of moisture kept in the earth in the various parts of the pot, it will always be possible to have water in the pan of the pot so as to increase the moisture of the air about the pot while insulating the latter at the same time from any warm base, such as a plate placed on a radiator of a domestic heating system.

It is of course possible to devise constructions other than those disclosed in the drawings and the specification, without the principle of the invention being departed from.

Having now particularly described the nature of my invention and the manner of its operation what I claim is:

1. A flowerpot comprising the combination, with a pot proper, of a porous bottom for said pot, means for exposing said porous bottom to direct contact with a water supply means in order to supply water therethrough to the interior of the pot, and at least one apertured portion disposed in the outer or side wall of said pot a distance above and spaced upwardly from the general level of said bottom and said water supply means with a porous stopper for said apertured portion extending from a limited distance within the wall to the exterior thereof and being capable of transmitting moisture from said interior to the exterior so as to allow examination of the moisture conditions within the pot from the exterior thereof.

2. A flowerpot according to claim 1, wherein the pot proper has an interior projecting rib near the lower edge thereof and the porous bottom for the pot comprises a bottom plate supported upon said rib and formed with a downwardly directed extension within the edge thereof capable of depending thereto a body of water when the pot proper stands in said water.

3. A flowerpot according to claim 1, wherein the water supply means includes a dish having a plurality of integral projections extending upwardly from the bottom thereof, said dish being adapted to contain a quantity of water at least partly submerging said projections, and recess portions extending a predetermined distance upwardly from the bottom edge of the pot proper and in at least one position of said pot registering with and clearing said projections of the dish so as to allow the pot proper to stand in lowered position in said water, and in other shifted positions of said pot to stand in raised position upon said projections of said dish.

4. A flowerpot according to claim 1, wherein the pot proper has an interior projecting rib near the lower edge thereof and the porous bottom for the pot comprises a bottom plate supported upon said rib and formed with a downwardly directed angular extension within the edge thereof capable of depending thereto a body of water when the pot proper stands in said water, and wherein the water supply means includes a dish having a plurality of integral projections extending upwardly from the bottom thereof, said dish being adapted to contain a quantity of water at least partly submerging said projections, and recess portions extending a predetermined distance upwardly from the bottom edge of the pot proper and in at least one position of said pot registering with and clearing said projections of the dish so as to allow the pot proper to stand in lowered position in said water, and in other shifted positions of said pot to stand in raised position upon said projections of said dish.

GUSTAF HAGLUND.